United States Patent
Hawwa et al.

(10) Patent No.: US 8,134,279 B2
(45) Date of Patent: Mar. 13, 2012

(54) PIEZOELECTRIC DAMPING DEVICE

(75) Inventors: Muhammad A. Hawwa, Dhahran (SA);
Yagoub N. Al-Nassar, Dhahran (SA);
Hussain M. Al-Oahtani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 303 days.

(21) Appl. No.: 12/588,406

(22) Filed: Oct. 14, 2009

(65) Prior Publication Data
US 2011/0084572 A1  Apr. 14, 2011

(51) Int. Cl.
*H02N 2/18* (2006.01)
(52) U.S. Cl. ........ 310/318; 310/319; 310/326; 310/327; 310/330
(58) Field of Classification Search .......... 310/318, 310/319, 326, 327, 330, 26
See application file for complete search history.

(56) References Cited

U.S. PATENT DOCUMENTS

| | | | |
|---|---|---|---|
| 4,958,100 A | 9/1990 | Crawley et al. | |
| 5,558,477 A | 9/1996 | Browning et al. | |
| 5,617,026 A | 4/1997 | Yoshino et al. | |
| 5,783,898 A | 7/1998 | Wu | |
| 5,960,912 A | 10/1999 | Nishizawa et al. | |
| 6,060,813 A | 5/2000 | Nowak | |
| 6,075,309 A | 6/2000 | Wu | |
| 6,109,110 A * | 8/2000 | Hwang | 73/654 |
| 6,138,996 A | 10/2000 | Hayashi et al. | |
| 6,310,746 B1 * | 10/2001 | Hawwa et al. | 360/97.01 |
| 6,483,741 B1 * | 11/2002 | Iwasaki et al. | 365/170 |
| 6,486,589 B1 | 11/2002 | Dujari et al. | |
| 6,563,250 B2 | 5/2003 | Mathur | |
| 6,624,708 B1 | 9/2003 | Wessendorf | |
| 6,688,618 B2 | 2/2004 | Schmidt et al. | |
| 6,829,157 B2 * | 12/2004 | Kim et al. | 365/157 |
| 6,870,303 B2 | 3/2005 | Park | |
| 7,375,911 B1 | 5/2008 | Li et al. | |
| 7,528,525 B2 | 5/2009 | Smith et al. | |
| 2003/0034624 A1 | 2/2003 | Schmidt et al. | |
| 2003/0057807 A1 | 3/2003 | Fleming et al. | |
| 2008/0036307 A1 | 2/2008 | Lu et al. | |
| 2008/0211491 A1 * | 9/2008 | Huang et al. | 324/209 |

FOREIGN PATENT DOCUMENTS
WO  WO2008021327 A1  2/2008
* cited by examiner

*Primary Examiner* — Walter Benson
*Assistant Examiner* — Bryan Gordon
(74) *Attorney, Agent, or Firm* — Richard C. Litman

(57) ABSTRACT

The piezoelectric damping device is a passive piezoelectric vibration suppression and damping device for reducing amplitude of vibration in structures. The piezoelectric damping device includes a magnetic layer having opposed inner and outer faces, with the inner face thereof being adapted for releasable magnetic attachment to a vibrating structure, such as a metallic pipe, for example. A piezoelectric layer is secured to the outer face of the magnetic layer. Preferably, an electrically insulating layer is sandwiched between the magnetic layer and the piezoelectric layer. The electrically insulating layer is preferably an electrically insulating adhesive. An electrical shunting circuit is in electrical communication with the piezoelectric layer, such that vibration in the piezoelectric layer caused by the vibrating structure generates electrical energy, which is then dissipated by the electrical shunting circuit, thus damping vibration in the vibrating structure.

10 Claims, 3 Drawing Sheets

PIEZOELECTRIC DAMPING DEVICE

BACKGROUND OF THE INVENTION

1. Field of the Invention

The present invention relates to amplitude reduction and damping of vibration in structures, and, more particularly, to a passive piezoelectric vibration suppression and damping device.

2. Description of the Related Art

Piezoelectricity is the ability of some materials (notably crystals and certain ceramics, including bone) to generate an electric potential in response to applied mechanical stress. This may take the form of a separation of electric charge across the crystal lattice. If the material is not short-circuited, the applied charge induces a voltage across the material. In a piezoelectric crystal, the positive and negative electrical charges are separated, but symmetrically distributed, so that the crystal, overall, is electrically neutral. Each of these sides forms an electric dipole, and dipoles near each other tend to be aligned in regions called Weiss domains. The domains are usually randomly oriented, but can be aligned during "poling", a process by which a strong electric field is applied across the material, usually at elevated temperatures.

When a mechanical stress is applied, this symmetry is disturbed, and the charge asymmetry generates a voltage across the material. For example, a 1 cm$^3$ cube of quartz with 2 kN of correctly applied force can produce a voltage of 12,500 V. Piezoelectric materials also show the opposite effect, called the converse piezoelectric effect, where the application of an electrical field creates mechanical deformation in the crystal.

Piezoelectricity is the combined effect of the electrical behavior of the material, given by $D=\epsilon E$, where D is the electric charge density displacement (also referred to as the electric displacement), $\epsilon$ is permittivity and E is electric field strength, and Hooke's Law, which is given as $S=sT$, where S is strain, s is compliance and T is stress.

These may be combined into so-called "coupled equations", of which the strain-charge form is given by $\{S\}=\lfloor S^E \rfloor\{T\}+\lfloor d^t \rfloor\{E\}$ and $\{D\}=\lfloor d \rfloor\{T\}+\lfloor \epsilon^t \rfloor\{E\}$, where [d] is the matrix for the direct piezoelectric effect and [$d^t$] is the matrix for the converse piezoelectric effect. The superscript E indicates a zero, or constant, electric field; the superscript T indicates a zero, or constant, stress field; and the superscript t stands for transposition of a matrix.

Many materials, both natural and man-made, exhibit piezoelectricity, such as berlinite ($AlPO_4$), a rare phosphate mineral that is structurally identical to quartz, cane sugar, quartz, Rochelle salt, topaz, and tourmaline-group minerals.

Structures, such as those used in aircraft and spacecraft, experience vibration during service. The vibration is undesirable because it is uncomfortable for occupants or can lead to control problems or damage to sensitive instruments in the vehicle. The vibration is also undesirable because it leads to fatigue damage of the structure itself. Care is taken in the design of the structure to minimize such vibration, but some vibration is always present regardless of the care taken in design.

A number of techniques have been developed to reduce the amplitude and achieve damping of the structural vibration. In one such common technique, energy-absorbing materials, such as elastomers, are built into the structure or into joints of the structure. These energy-absorbing materials reduce the amplitude of the vibration without damage to the materials.

In another approach, piezoelectric materials are used to convert mechanical vibrational energy into electrical energy, and the electrical energy is thereafter dissipated. A piezoelectric material is one that converts electrical energy into mechanical movement, or, conversely, converts mechanical movement such as vibration into an electrical voltage. A "patch" of the piezoelectric material is fixed to the surface of the structure that vibrates during service, so that vibrational energy in the structure is transferred into the piezoelectric material. Voltage leads from the piezoelectric material are connected to external electrical circuitry, where either a counter voltage is generated (an "active" vibration control technique) or the energy in the voltage produced by the piezoelectric material is dissipated (a "passive" vibration control technique). The active vibration control technique requires that the counter voltage be generated and fed back to the structure, and therefore requires more complex circuitry than the passive vibration control approach.

Passive piezoelectric shunting has been known for some time, but the existing techniques have drawbacks in their application. The efficiency of the external electrical circuitry can be improved and the available piezoelectric shunting methodology is also difficult to apply to reduce and to damp a number of different vibrational modes, which are usually present in complex structures. There is therefore a need for an improved approach to passive piezoelectric shunting of structures. Such an approach would be useful for aerospace structures, but would also find applications in a wide variety of other areas such as the tuning of acoustic components and structures.

Thus, a piezoelectric damping device solving the aforementioned problems is desired.

SUMMARY OF THE INVENTION

The piezoelectric damping device is a passive piezoelectric vibration suppression and damping device for reducing amplitude of vibration in structures. The piezoelectric damping device includes a magnetic layer having opposed inner and outer faces, with the inner face thereof being adapted for releasable magnetic attachment to a vibrating structure, such as a metallic pipe, for example.

A piezoelectric layer is secured to the outer face of the magnetic layer. Preferably, an electrically insulating layer is sandwiched between the magnetic layer and the piezoelectric layer. The electrically insulating layer is preferably an electrically insulating adhesive. An electrical shunting circuit is in electrical communication with the piezoelectric layer, such that vibration in the piezoelectric layer caused by the vibrating structure generates electrical energy, which is then dissipated by the electrical shunting circuit, thus damping vibration in the vibrating structure.

In an alternative embodiment, a pair of damping elements is provided. Each damping element includes a mount having a substantially U-shaped cross-sectional contour for partially covering the vibrating structure. The mount has opposed first and second ends. First and second magnets are respectively secured to the first and second ends of the mount, and a piezoelectric layer is secured to an outer face of the mount.

An electrical shunting circuit is in electrical communication with the piezoelectric layer and the first and second magnets of the pair of damping elements are oriented such that the pair of damping elements are both secured about the vibrating structure by magnetic attraction therebetween. Vibration in each piezoelectric layer caused by the vibrating structure generates electrical energy, which is then dissipated by the electrical shunting circuits, thus damping vibration in the vibrating structure. This embodiment may be used when the vibrating structure is formed from a non-paramagnetic material.

In another alternative embodiment, also useful when the vibrating structure is formed as a relatively thin layer or is formed from a non-paramagnetic material, the piezoelectric damping device includes a magnetic layer having opposed inner and outer faces, with the inner face thereof being adapted for contacting a first face of the vibrating structure. A magnet adapted for contacting an opposed, second face of the vibrating structure is also provided, with the magnet being oriented such that the magnetic layer and the magnet are releasably secured to the vibrating structure by magnetic attraction therebetween.

A piezoelectric layer is secured to the outer face of the magnetic layer, and an electrical shunting circuit is in electrical communication with the piezoelectric layer. Preferably, an electrically insulating layer is sandwiched between the magnetic layer and the piezoelectric layer. The electrically insulating layer is preferably an electrically insulating adhesive.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
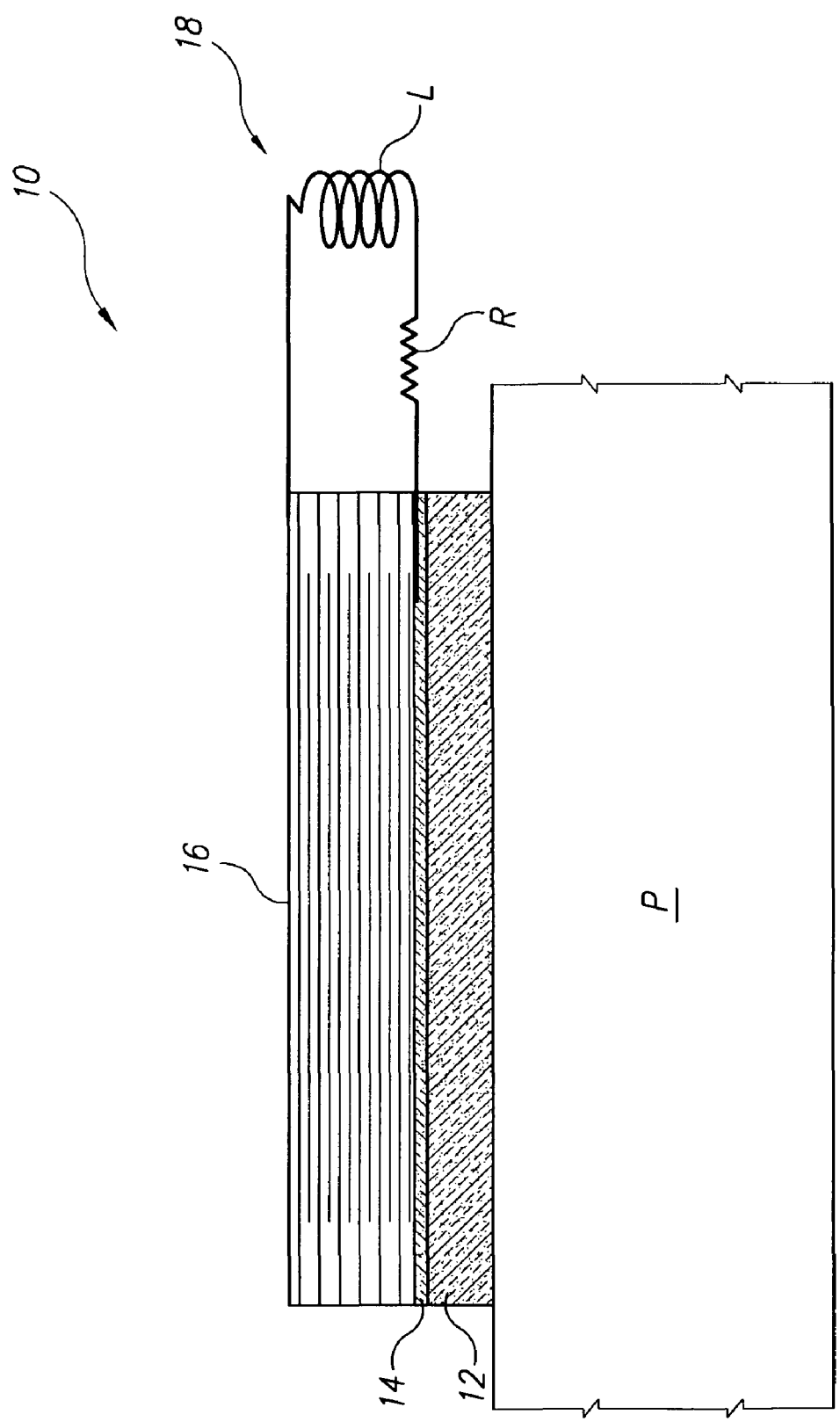
FIG. 1 is a diagrammatic representation of a piezoelectric damping device according to the present invention.

Referring to FIG. 1, the piezoelectric damping device 10 is a passive piezoelectric vibration suppression and damping device for reducing the amplitude of vibration in structures, such as the exemplary metallic pipe P. The piezoelectric damping device 10 includes a magnetic layer 12 having opposed inner and outer faces, the inner face being adapted for releasable magnetic attachment to the vibrating metallic pipe P.

A piezoelectric layer 16 is disposed on the outer face of the magnetic layer 12. Preferably, an electrically insulating layer 14 is sandwiched between the magnetic layer 12 and the piezoelectric layer 16. The electrically insulating layer 14 is preferably an electrically insulating, double-faced adhesive. An electrical shunting circuit 18 is in electrical communication with the piezoelectric layer 16, so that vibration in the piezoelectric layer 16 caused by the vibrating structure P generates electrical energy, which is then dissipated by the electrical shunting circuit 18, thus damping vibration in the vibrating structure P, as the energy of vibration is converted to electrical energy, which is then dissipated. The electrical shunting circuit 18 may be any suitable type of circuit that dissipates electrical energy as heat, light, sound or any other non-destructive form of energy. The electrical shunting circuit may be in the form of an LR-circuit, such as the inductor L shown in FIG. 1 connected in series with resistor R.

The magnetic material forming magnetic layer 12 may be any suitable type of magnetic material for releasable attachment to a metal pipe or the like. Magnetic layer 12 may be formed as an elastic or visco-elastic layer with magnetic particles dispersed therein. Similarly, any suitable type of electrically insulating, adhesive material may be used to form the electrically insulating layer 14, and any suitable type of piezoelectric material may be used to form piezoelectric layer 16.

"Motion transmissibility" refers to the ratio of the amplitude of vibration of the piezoelectric layer 16, x, divided by the amplitude of vibration of the vibrating structure P, given as $x_0$. Modeling the magnetic layer 12 as an idealized spring-mass-damper system, then a one-degree of freedom approximation can be used to define harmonic motion transmissibility as:

$$\frac{x}{x_0} = \frac{\left[1 + 4\xi^2\left[\frac{\varpi}{\varpi_n}\right]^2\right]^{1/2}}{\left[\left[1 - \left[\frac{\varpi}{\varpi_n}\right]^2\right]^2 + 4\xi^2\left[\frac{\varpi}{\varpi_n}\right]^2\right]^{1/2}}$$

where $\xi$ is the magnetic layer damping ration, $\omega$ is the host structure frequency and $\omega_n$ is the natural frequency of the magnetic layer 12. If the motion is not simply harmonic, the periodic motion can be viewed as a combination of many harmonics, according to Fourier series analysis. The material forming the magnetic layer 12 is preferably selected to have a motion transmissibility of one.

Figure 2:
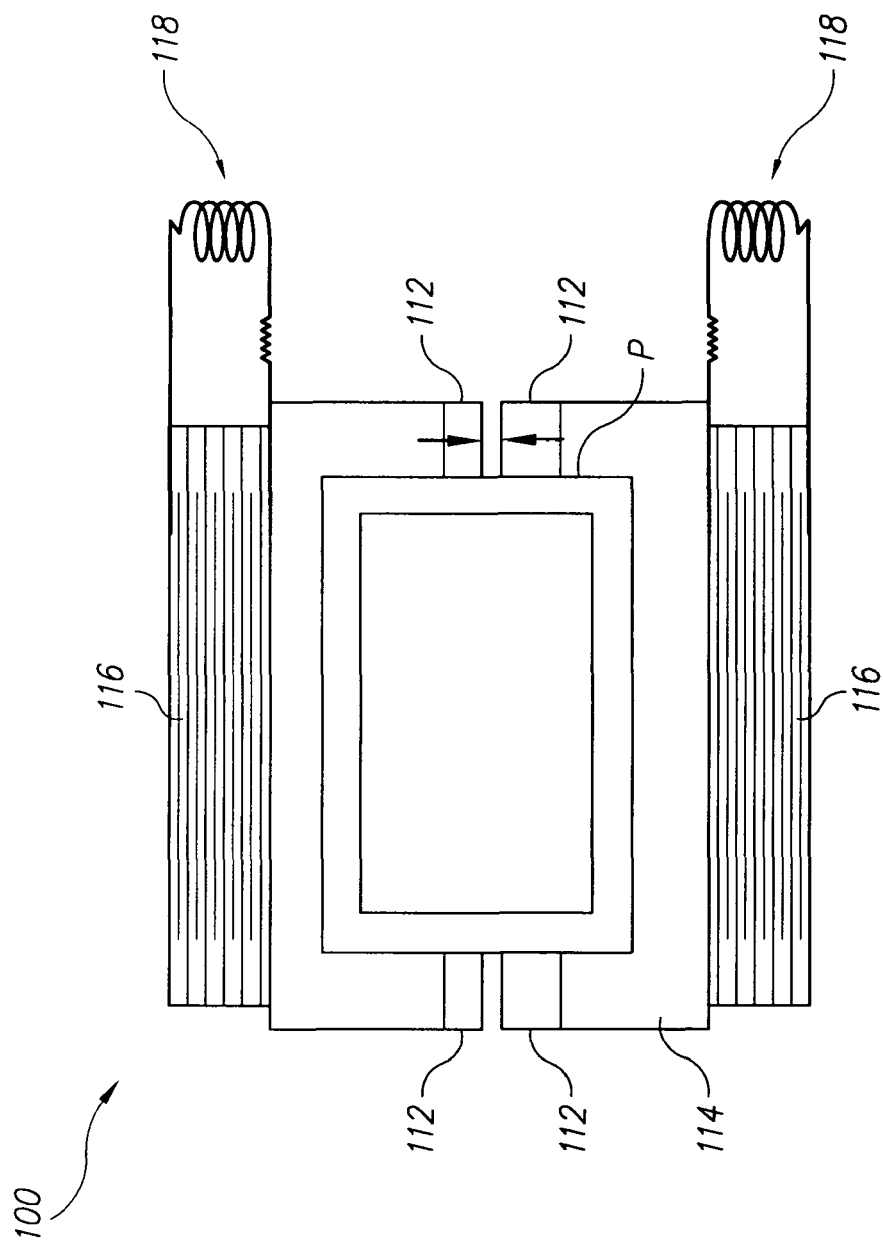
FIG. 2 is a diagrammatic representation of an alternative embodiment of the piezoelectric damping device according to the present invention.

In the alternative embodiment of FIG. 2, a pair of damping elements forming the piezoelectric damping device 100 are provided. Each damping element includes a mount 114 having a substantially U-shaped cross-sectional contour for partially covering the vibrating structure. In FIG. 2, the vibrating pipe P is shown as having a substantially rectangular contour (and the contouring of mounts 114 is selected to mate with pipe P), though it should be understood that the contouring of pipe P is shown for exemplary purposes only. Each mount has opposed first and second ends, as shown, and first and second magnets 112 are respectively secured to the first and second ends of the mount 114. A piezoelectric layer 116, similar to layer 16 of FIG. 1, is secured to an outer face of each mount 114.

An electrical shunting circuit 118, similar to circuit 18 of FIG. 1, is in electrical communication with each piezoelectric layer 116, and the first and second magnets 112 of the pair of damping elements are oriented such that the pair of damping elements are both secured about the vibrating structure P by magnetic attraction therebetween. Vibration in each piezoelectric layer 116 caused by the vibrating structure P generates electrical energy, which is then dissipated by the electrical shunting circuits 118, thus damping vibration in the vibrating structure P. This embodiment may be used when the vibrating structure P is formed from a non-paramagnetic material.

Figure 3:
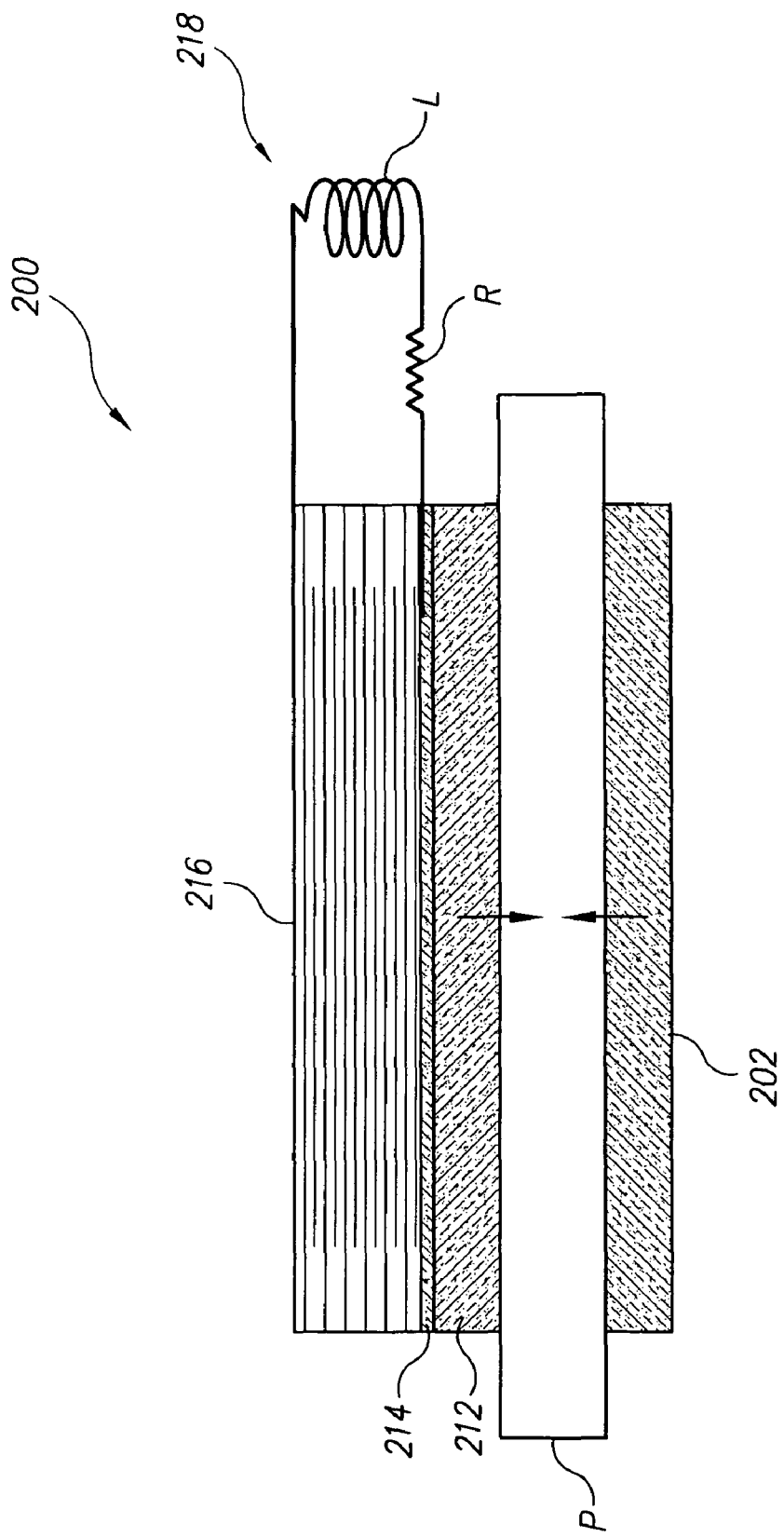
FIG. 3 is a diagrammatic representation of another alternative embodiment of the piezoelectric damping device according to the present invention.

FIG. 3 illustrates another alternative embodiment of the piezoelectric damping device 200, which also useful when the vibrating structure P is formed as a relatively thin layer, as shown, or is formed from a non-paramagnetic material, as in FIG. 2. The piezoelectric damping device 200 includes a magnetic layer 212, similar to layer 12 of FIG. 1, having opposed inner and outer faces. The inner face thereof is adapted for contacting a first face of the vibrating structure P. A magnet 202, adapted for contacting an opposed, second face of the vibrating structure P, is also provided, with the magnet 202 being oriented such that the magnetic layer 212 and the magnet 202 are releasably secured to the vibrating structure P by magnetic attraction therebetween.

A piezoelectric layer 216, similar to layer 16 of FIG. 1, is secured to the outer face of the magnetic layer 212, and an electrical shunting circuit 218 is in electrical communication with the piezoelectric layer 216. Preferably, an electrically insulating layer 214 is sandwiched between the magnetic layer 212 and the piezoelectric layer 216, similar to layer 14 of FIG. 1. The electrically insulating layer 214 is preferably an electrically insulating adhesive, as described above.

It is to be understood that the present invention is not limited to the embodiments described above, but encompasses any and all embodiments within the scope of the following claims.

We claim:

1. A piezoelectric damping device, comprising:
    a magnetic layer having opposed inner and outer faces, the inner face being adapted for releasable magnetic attachment to a vibrating structure;
    a piezoelectric layer disposed on the outer face of the magnetic layer; and
    an electrical shunt circuit in electrical communication with the piezoelectric layer;
    whereby vibration in the piezoelectric layer caused by the vibrating structure generates electrical energy, the electrical energy being dissipated by the electrical shunt circuit, damping vibration in the vibrating structure.

2. The piezoelectric damping device as recited in claim 1, further comprising an electrically insulating layer sandwiched between said magnetic layer and said piezoelectric layer.

3. The piezoelectric damping device as recited in claim 2, wherein the electrically insulating layer comprises an electrically insulating adhesive.

4. The piezoelectric damping device as recited in claim 1, wherein the electrical shunt circuit comprises an inductor connected in series with a resistor.

5. A piezoelectric damping device, comprising a pair of damping elements, each of the damping elements having:
    a substantially U-shaped mount having opposed first and second ends, the mount being adapted for partially covering a vibrating structure;
    first and second magnets respectively attached to the first and second ends of the mount;
    a piezoelectric layer disposed on an outer face of the mount; and
    an electrical shunt circuit in electrical communication with the piezoelectric layer, the first and second magnets of the pair of damping elements being oriented so that the pair of damping elements are both adapted for attachment about the vibrating structure;
    whereby vibration in each of the piezoelectric layers caused by the vibrating structure generates electrical energy, the electrical energy being dissipated by the electrical shunt circuits, thereby damping vibration in the vibrating structure.

6. The piezoelectric damping device as recited in claim 5, wherein each said electrical shunting circuit comprises an inductor connected in series with a resistor.

7. A piezoelectric damping device, comprising:
    a magnetic layer having opposed inner and outer faces, the inner face being adapted for contacting a first face of a vibrating structure;
    a magnet adapted for contacting an opposed, second face of the vibrating structure, the magnet being oriented so that the magnetic layer and the magnet are releasably attached to the vibrating structure by magnetic attraction therebetween;
    a piezoelectric layer disposed on the outer face of the magnetic layer; and
    an electrical shunt circuit in electrical communication with the piezoelectric layer;
    whereby vibration in the piezoelectric layer caused by the vibrating structure generates electrical energy, the electrical energy being dissipated by the electrical shunt circuit, thereby damping vibration in the vibrating structure.

8. The piezoelectric damping device as recited in claim 7, further comprising an electrically insulating layer sandwiched between said magnetic layer and said piezoelectric layer.

9. The piezoelectric damping device as recited in claim 8, wherein the electrically insulating layer comprises an electrically insulating adhesive.

10. The piezoelectric damping device as recited in claim 7, wherein the electrical shunt circuit comprises an inductor connected in series with a resistor.

* * * * *